United States Patent
Fiege et al.

(10) Patent No.: US 10,351,047 B2
(45) Date of Patent: Jul. 16, 2019

(54) DEVICE AND METHOD FOR CONTROLLING A HEADLIGHT

(71) Applicant: DAIMLER AG, Stuttgart (DE)

(72) Inventors: Marcus Fiege, Stuttgart (DE); Joerg Moisel, Neu-Ulm (DE); Axel Mueller, Schorndorf (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 15/767,783

(22) PCT Filed: Aug. 27, 2016

(86) PCT No.: PCT/EP2016/001453
§ 371 (c)(1),
(2) Date: Apr. 12, 2018

(87) PCT Pub. No.: WO2017/063725
PCT Pub. Date: Apr. 20, 2017

(65) Prior Publication Data
US 2018/0297508 A1  Oct. 18, 2018

(30) Foreign Application Priority Data
Oct. 13, 2015 (DE) .................. 10 2015 013 271

(51) Int. Cl.
*B60Q 1/08* (2006.01)
*F21S 41/63* (2018.01)
(Continued)

(52) U.S. Cl.
CPC ........... *B60Q 1/085* (2013.01); *B60Q 1/1423* (2013.01); *F21S 41/147* (2018.01); *F21S 41/25* (2018.01);
(Continued)

(58) Field of Classification Search
CPC .................... B60Q 1/085; B60Q 2300/42; B60Q 2300/45; B60Q 1/076; B60Q 1/1423;
(Continued)

(56) References Cited

U.S. PATENT DOCUMENTS

| 5,426,294 | A | 6/1995 | Kobayashi et al. | |
| 6,986,593 | B2* | 1/2006 | Rhoads | F21S 9/022 362/308 |

(Continued)

FOREIGN PATENT DOCUMENTS

| DE | 4317772 A1 | 1/1994 |
| DE | 10260398 A1 | 8/2004 |

(Continued)

OTHER PUBLICATIONS

International Search Report dated Dec. 8, 2016 in related International Application No. PCT/EP2016/001453.
(Continued)

*Primary Examiner* — Vibol Tan
(74) *Attorney, Agent, or Firm* — Patent Portfolio Builders PLLC

(57) ABSTRACT

A device and a method for controlling at least one headlight for a motor vehicle involve a control apparatus, at least one sensor configured to detect information about objects in a surrounding area of the motor vehicle and to supply the detected information to the control apparatus. The headlight can be adjusted by the control apparatus depending on at least one detected object. A range between at least one light source and at least one lens of the headlight can be adjusted by the control apparatus in order to adapt a projection of the light source to the at least one detected object.

13 Claims, 1 Drawing Sheet

Figure 1:
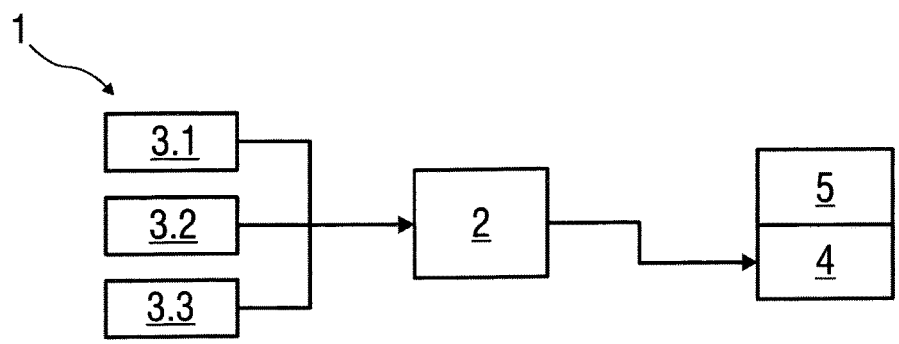

(51) Int. Cl.
*B60Q 1/14* (2006.01)
*G06K 9/00* (2006.01)
*G06K 9/20* (2006.01)
*F21S 41/147* (2018.01)
*F21S 41/25* (2018.01)
*F21S 41/657* (2018.01)
*F21S 41/663* (2018.01)

(52) U.S. Cl.
CPC ........... *F21S 41/635* (2018.01); *F21S 41/657* (2018.01); *F21S 41/663* (2018.01); *G06K 9/00208* (2013.01); *G06K 9/00791* (2013.01); *G06K 9/2027* (2013.01); *B60Q 2300/45* (2013.01)

(58) Field of Classification Search
CPC .... B60Q 2300/112; B60Q 1/20; B60Q 1/245; B60Q 2300/314; B60Q 2300/41; B60Q 1/00; B60Q 1/04; B60Q 1/115; B60Q 2300/312; F21S 41/255; F21S 41/657; F21S 41/635; F21V 14/00; F21K 9/00
See application file for complete search history.

(56) References Cited

U.S. PATENT DOCUMENTS

| | | | | |
|---|---|---|---|---|
| 7,502,046 | B2 * | 3/2009 | Ono | B41J 2/471 347/241 |
| 7,963,686 | B2 * | 6/2011 | Hu | F21V 5/04 362/547 |
| 8,096,689 | B2 * | 1/2012 | Engl | F21S 41/16 362/514 |
| 8,147,106 | B2 | 4/2012 | Eto et al. | |
| 8,408,765 | B2 * | 4/2013 | Kuhlman | B60Q 1/085 362/488 |
| 8,858,026 | B2 * | 10/2014 | Lee | F21K 9/00 362/249.02 |
| 9,058,736 | B2 * | 6/2015 | Gannot | A61B 5/1117 |
| 9,481,291 | B2 * | 11/2016 | Shibata | B60Q 1/0683 |
| 9,616,805 | B2 | 4/2017 | Galbas | |
| 9,667,921 | B2 | 5/2017 | Faber et al. | |
| 9,695,993 | B2 * | 7/2017 | Chen | F21S 41/143 |
| 10,030,835 | B2 * | 7/2018 | Wu | B60Q 1/1423 |
| 2012/0287493 | A1 | 11/2012 | Kuhlman et al. | |
| 2013/0107552 | A1 | 5/2013 | Ahn et al. | |
| 2014/0321135 | A1 | 10/2014 | Chen et al. | |
| 2015/0117043 | A1 * | 4/2015 | Shibata | B60Q 1/0683 362/512 |
| 2015/0138787 | A1 * | 5/2015 | Wu | B60Q 1/1423 362/466 |

FOREIGN PATENT DOCUMENTS

| | | |
|---|---|---|
| DE | 10354104 A1 | 6/2005 |
| DE | 102005024781 A1 | 12/2005 |
| DE | 102005036002 A1 | 2/2007 |
| DE | 102011081357 A1 | 2/2013 |
| DE | 102012107033 A1 | 5/2013 |
| DE | 102012014734 A1 | 1/2014 |
| EP | 1506893 A2 | 2/2005 |
| EP | 1970249 A2 | 9/2008 |
| EP | 2128521 A1 | 12/2009 |
| EP | 2420408 A1 | 2/2012 |
| WO | 2012130715 A1 | 10/2012 |
| WO | 2016037812 A1 | 3/2016 |

OTHER PUBLICATIONS

Written Opinion dated Dec. 8, 2016 in related International Application No. PCT/EP2016/001453.

* cited by examiner

DEVICE AND METHOD FOR CONTROLLING A HEADLIGHT

BACKGROUND AND SUMMARY OF THE INVENTION

Exemplary embodiments of the invention relate to a device and a method for controlling at least one headlight in a motor vehicle.

A method for automatically controlling vehicle headlights is known from European patent document EP 2 420 408 B1, comprising an image sensor that generates a multitude of pixel planes of a projected setting or location, and comprises a control device for generating headlight control signals, wherein the method comprises the following steps:
  receiving pixel levels by the image sensor;
  analyzing the image which was supplied by the image sensor in order to determine the number of current, alternating light source objects in the image; and
  selectively generating a headlight control signal according to the results of the steps of analyzing and of preventing operation of the distant lights if the number of alternating current light sources exceeds a threshold value.

A method for providing a signal for a light control unit of at least one headlight of a vehicle is known from PCT International patent document WO 2012/130715 A1. The vehicle has a camera for detecting a vehicle surrounding, wherein the method comprises a step of determining a distance between the vehicle and another vehicle by using the camera. Furthermore, the method comprises a step of ascertaining a distance between the vehicle and the other vehicle by using a sensor independent of the camera. Furthermore, the method comprises a step of checking the plausibility of the spacing by using the distance, wherein the spacing is plausibility-checked when a difference between the spacing and the distance is smaller than a tolerance value. Finally, the method comprises a step of providing the spacing via an interface for a light control unit of the headlight.

A method for controlling a lighting device of a vehicle guided by an operating person is known from German patent document DE 10 2005 036 002 A1, wherein a viewing direction of the operating person of the roadway in front of him is detected and wherein, depending on the information detected about the viewing direction, at least one parameter of at least one headlight of the lighting device is set, the headlight being able to be set and adjusted. Furthermore, a headlight system and a processing device for carrying out such a method are disclosed.

A method for controlling the illumination of a lateral roadway region by means of an auxiliary headlight for a vehicle is known from German patent document DE 103 54 104 A1, wherein the trajectory of an object moving in front of and/or to the side of the vehicle is determined by means of a spacing-giving sensor using a subsequent evaluation algorithm and, in the event of a collision possibility of the object with the vehicle, the auxiliary headlight is directed towards the object.

A vehicle support system and a corresponding method for improving the sight of a driver are known from European patent document EP 1 970 249 A2. The vehicle can be equipped with at least one UV light that irradiates the surrounding area with UV rays. In some examples, the direction or the intensity of the UV rays can be changed depending on vehicle variables and surroundings variables.

With a headlight, it is known from German patent document DE 10 2005 024 781 A1 to tilt light source units around predetermined tilting central axes with the aid of an alignment mechanism, which is arranged between a light body and the light source units. The alignment mechanism has a tilt lever pivot (a ball-and-socket joint), alignment screws, which are rotatably mounted on the light body, and nut parts, which sit on the screws in threaded engagement, and are applied to the light source units in such a way that they can move forwards and backwards in response to the rotation of the screws in order to thus tilt the light source units around the tilt central axes. A leaf spring sliding portion, which is shifted into elastic engagement with a guide groove, consists of polyacetal resin, which has a higher wear resistance. A nut part main body, which has a screw thread fixing portion, consists of nylon resin, which has a better heat resistance. There is no permanent deformation on the sliding portion, and a sliding touch surface does not wear, and there is no slack in the screw thread fixing portion of the nut part main body. Thus, an exact setting of the optical axis can be ensured.

Exemplary embodiments of the invention are directed to an improved device and an improved method for controlling at least one headlight in a motor vehicle.

A device according to the invention for controlling at least one headlight in a motor vehicle comprises a control apparatus and at least one sensor, by means of which information about objects in a surrounding area of the motor vehicle can be detected and supplied to the control device, wherein the headlight can be adjusted depending on at least one object detected. A range between at least one light source of the headlight and at least one lens of the headlight can be adjusted by the control apparatus in order to focus a projection of the light source on a certain removal dependent on the at least one object detected.

In the method according to the invention for controlling at least one headlight in a motor vehicle, information about objects in a surrounding area of the motor vehicle are detected by means of at least one sensor and supplied to a control apparatus, wherein the headlight is adjusted by the control apparatus depending on at least one object detected, wherein a range between at least one light source and at least one lens of the headlight is adjusted by the control apparatus in order to focus a projection of the light source at a certain range dependent on the at least one object detected.

Conventional headlights are so-called afocal systems, i.e., they project a light source, for example a filament of a halogen lamp, an arc of a discharge lamp or an LED surface, approximately to infinity. Between an exit surface of the light and an impact surface, for example of a roadway, a traffic sign, inter alia, there is no point at which a sharp image of the light source emerges. Headlight systems are known in which an array of light-emitting diodes (LED) is used as the electronically controllable light source. The LED array or an exit surface of a primary optical of the LED array is typically projected at a finite spacing, for example 25 m. Other spacings are also possible, yet in the prior art these cannot be changed after the final production of the headlight. With rather low numbers of pixels of less than 100 or with a rough resolution of more than 1 per pixel, this is relatively uncritical. In order to be able to use finer resolutions, i.e., greater numbers of pixels, a yet sharper projecting optic system is desirable. However, this leads to a really sharp light image only being possible at exactly one range, similar to with a slide or video projector. Depending on the traffic situation, different spacings can nevertheless be desirable. It is known of optical devices, for example cameras or slide projectors, to retrospectively set the correct projection spacing. Here, the spacing between object/image plane and lens is regularly corrected. In cameras, for example, the maximum contrast is used to do so. To set a headlight, the contrast auto-focus common in cameras is, however, unsuitable since there is no defined projection surface.

With the device according to the invention and the method according to the invention, an auto-focusing of the light of a headlight is achieved, such that the projection of the light source, for example, can be focused exactly on a particular object in order to improve the perceptibility of the object. The projection of the light source can also be focused outside this object in such a way that the danger of dazzling for the object is reduced or minimized.

In an embodiment, the light source is formed as a row or array of light-emitting diodes and/or comprises an array of moveable micro-mirrors, in particular on one single chip. However, the device and the method can also be used with conventional gas discharge lamps.

In an embodiment, a servomotor is arranged for adjusting the range between the light source and the lens, the servomotor being controllable by the control apparatus. A different kind of actuator is also possible for this adjustment, for example a pneumatic or hydraulic actuator.

In an embodiment, the at least one sensor is formed as a radar sensor and/or as a LiDar sensor and/or as a stereo camera. In motor vehicles, such sensors are often already provided for assistance systems. For example, cameras are used in the automobile light control that detect oncoming traffic and hide corresponding angle regions from the light distribution (so-called partial high-beam). Furthermore, radar systems for spacing measuring are known. These sensors can also be used by the method according to the invention and the device according to the invention, such that no additional sensors are required.

In an embodiment, the information compiled by means of the at least one sensor comprises an attitude angle and/or a range and/or a rate of change in range of at least one object in a surrounding area of the motor vehicle. In this way, the control apparatus obtains information on objects taken into consideration when focusing.

In an embodiment, the control apparatus is formed to compile an object list from the information, to select at least one of the objects from the object list as the relevant object, and to determine a range at which the projection of the light source is to be focused, corresponding to the selected object, and to correspondingly control the servomotor.

With numerous objects with relative movement to the headlight, it should be decided which of the objects is particularly relevant for the focus of the headlight. This can be decided by means of a specific criterion, for example a greatest danger of dazzling for the respective object. The control apparatus then determines a range at which the projection of the light source is to be focused, corresponding to the selected object and the criterion, and correspondingly controls the servomotor or a different actuator.

In an embodiment, a rate of change in range of at least one object in the surrounding area of the motor vehicle can be ascertained by means of the at least one sensor, such that the range between the at least one light source and the at least one lens can be tracked by the control apparatus in order to keep the projection of the light source focused with respect to the selected object in the event of a relative movement between the selected object and the motor vehicle. In this way, latencies in the system can be avoided.

In an embodiment, at least two headlights can be provided with corresponding servomotors, wherein the control apparatus is formed to focus the projections of the light sources of the at least two headlights differently with respect to different objects. In this way, one of the headlights can be focused on a traffic sign, for example, while the other is focused in such a way that a different traffic participant or a detected wild animal is not dazzled.

In an embodiment, the light source can be tilted relative to the lens. In contrast to optical device such as cameras and projectors, in which object and image planes are at least approximately in parallel, in street traffic, as sharp a projection as possible on the roadway can also be desired, in particular at different spacings. In classic photography, non-parallel object and image planes can be sharply projected one on the other by tilting the objective. With a headlight of a motor vehicle, however, this would lead to a "squinting" of the design-relevant lenses. By tilting the light source, if necessary by means of an additional actuator, in particular a servomotor, a sharp projected image deviating from the perpendicular can be obtained without this disadvantage.

Instead of the tiltable light source, a fixedly arranged light source having an additional adjustable, in particular tiltable, optical element can also be provided between the light source and the lens, which causes a virtual tilting of the plane of the light source relative to the plane of the lens.

Furthermore, the invention comprises a headlight fitted with a device. The integration of the device into the headlight or together with the headlight enables the headlight control apparatus and the operating software for the headlight control apparatus to be specifically optimized for the type of headlight. In doing so, an extensive independence from the control apparatus network of the whole motor vehicle can be achieved. The headlight can be designed as a plug-and-play module and developed as a complete model, including complete control. This has particular advantages in terms of the cooperation of the vehicle manufacturers and the headlight suppliers. In this case, the headlight supplier can independently and extensively test the headlight control device. A further advantage of this integrated solution lies in the availability and production of headlights as replacement parts. The replacement headlights, including the control, can also be produced years after first use, when subsequent generations have been used in vehicle mass production for a long time, manufactured as a module and installed as replacement parts. Here, the plug-and-play functionality also aids an integrated solution.

BRIEF DESCRIPTION OF THE DRAWING FIGURES

Exemplary embodiments of the invention are illustrated in greater detail below by means of drawings.

Figure 2:
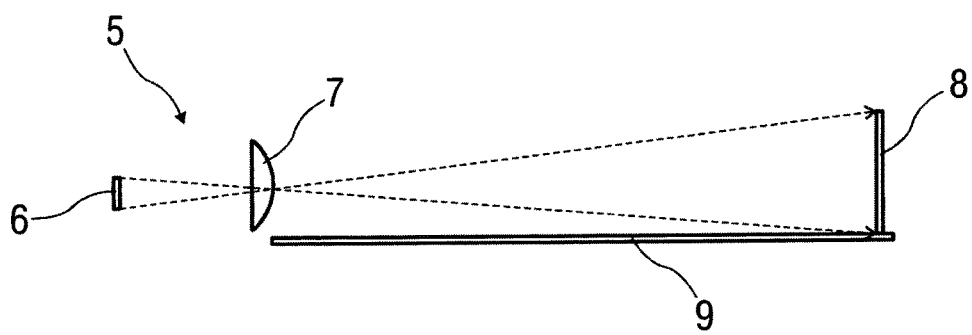
Figure 3:
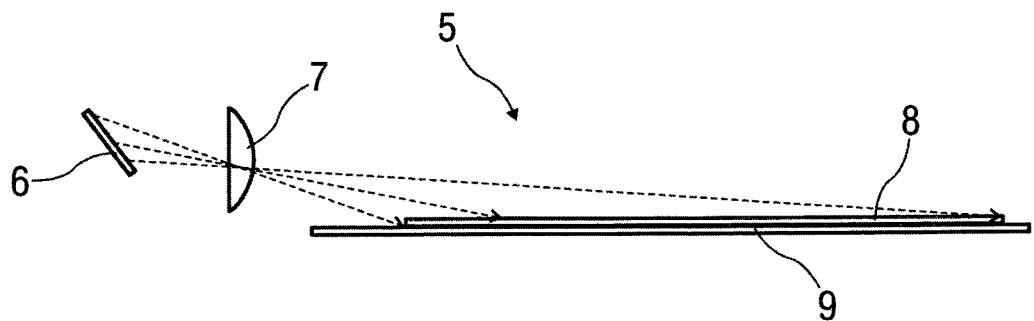

Here are shown:

FIG. 1 a schematic view of a device for controlling headlights in a motor vehicle, FIG. 2 a schematic view of a light source and a lens of a headlight and a substantially perpendicular projection of the light source, and FIG. 3 a schematic view of a light source and lens of a headlight and a substantially horizontal projection of the light source.

Parts that correspond to one another are provided with the same reference numerals in all figures.

DETAILED DESCRIPTION

FIG. 1 shows a schematic view of a device 1 for controlling headlights in a motor vehicle. The device 1 comprises a control apparatus 2, at least one sensor 3.1, 3.2, 3.3 and at least one servomotor 4 for at least one headlight 5. The servomotor 4 serves for setting a range between at least one light source and at least one lens of the headlight 5 in order to focus a projection of the light source at a certain range.

Information about objects in a surrounding area of the motor vehicle can be supplied to the control device 2 from the at least one sensor 3.1, 3.2, 3.3, in particular from several sensors 3.1, 3.2, 3.3. In the exemplary embodiment shown, three sensors 3.1, 3.2, 3.3 are provided, wherein the sensor 3.1 is formed as a radar sensor, the sensor 3.2 as a LiDar sensor and the sensor 3.3 as a stereo camera.

In exemplary embodiments not depicted, a different number of sensors 3.1, 3.2, 3.3, for example only one sensor, two sensors or more than three sensors, can be provided.

The information ascertained by means of the sensors 3.1, 3.2, 3.3 can, for example, comprise an attitude angle, a range and/or a rate of change in range of at least one object in a surrounding area of the motor vehicle.

The control apparatus 2 is formed to compile an object list from this information, for example in the form of a three-dimensional surroundings model of the motor vehicle. Furthermore, the control device 2 can be formed to select at least one of the objects from the object list as the relevant object, for example by means of a specific criterion, such as a greatest danger of dazzling for the respective object. The control apparatus 2 then determines a range at which the projection of the light source is to be focused, corresponding to the selected object and the criterion and correspondingly controls the servomotor 4. For example, the projection of the light source can be focused exactly on this object in order to improve the perceptibility of the object. The projection of the light source can also be focused outside this object in such a way that the danger of dazzling for the object is reduced or minimized.

In particular, a change in range of at least one object in the surrounding area of the motor vehicle is determined by means of the at least one sensor 3.1, 3.2, 3.3, such that the control apparatus 2 can track the servomotor 4 to avoid latencies, and the projection of the light source also remains focused with respect to the selected object in the event of a relative movement between the selected object and the motor vehicle, corresponding to the chosen criterion.

In an exemplary embodiment, the device 1 has two or more headlights 5 having corresponding servomotors 4 which are focused by the control apparatus 2 with respect to different objects, in particular, at different ranges.

FIG. 2 shows a schematic view of a light source 6 and a lens 7 of a headlight 5. The light source 6 can be formed substantially linear or planar and, in the exemplary embodiment shown, is aligned substantially parallel to the lens 7, such that a plane of the light source 6 and a plane of the projection 8 of the light source 6 are substantially parallel, in particular in such a way that the projection 8 of the light source 6 is substantially perpendicular on a roadway 9. By controlling the servomotor 4 (see FIG. 1), the spacing between the light source 6 and the lens 7 and thus also the spacing between the lens 7 and the projection 8 can be varied.

FIG. 3 shows a further schematic view of a light source 6 and a lens 7 of a headlight 5. In the exemplary embodiment shown, the light source 6 is tilted in relation to FIG. 2, such that it is not aligned in parallel to the plane of the lens 7. A plane of the light source 6 and a plane of the projection 8 of the light source 6 are thus also not parallel. The light source 6 is tilted in such a way that the projection 8 of the light source 6 deviates from the perpendicular, for example lies substantially horizontal on the roadway 9. By controlling the servomotor 4 (see FIG. 1), the spacing between the light source 6 and the lens 7 and thus also the spacing between the lens 7 and the projection 8 of the light source 6 can be varied.

In an embodiment not depicted, a fixedly arranged light source 6 having a further optical element between the light source 6 and the lens 7 can be provided instead of the tiltable light source 6, the optical element causing a virtual tilting of the plane of the light source 6 relative to the plane of the lens 7.

A further servomotor can be provided to tilt the light source 6 or the further optical element. This can also be controlled by the control apparatus 2 or by a further control apparatus.

The light source 6 can be formed, in particular, as a row or an array of light-emitting diodes (LED). It can also be provided to switch off individual ones of these light-emitting diodes or individual rows or partial arrays of these light-emitting diodes in order to reduce or to minimize the danger of dazzling for detected objects.

The light source 6 can also comprise an array of moveable micro-mirrors, in particular on one single chip (not depicted).

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A device for controlling at least one headlight in a motor vehicle, the device comprising:
   a control apparatus;
   at least one sensor configured to detect information about objects in an area surrounding the motor vehicle and to supply the information to the control apparatus,
   wherein the control apparatus is configured to adjust the headlight depending on at least one detected object,
   wherein a light source comprises a row or an array of light-emitting diodes or comprises an array of moveable micro-mirrors,
   wherein the control apparatus is configured to adjust a range between the light source and at least one lens of the headlight so that a projection of the light source is focused on a certain range dependent on at least one detected object,
   wherein the control apparatus is configured to control a servomotor, which is configured to adjust the range between the light source and the lens, and
   wherein the control apparatus is configured to compile an object list from the information about the objects, to select at least one of the objects from the object list as a relevant object, and to determine a range at which the projection of the light source is to be focused, corresponding to the selected object, and to correspondingly control the servomotor.

2. The device of claim 1, wherein the at least one sensor is a radar sensor, a LiDar sensor, or a stereo camera.

3. The device of claim 1, wherein the information about objects detected by the at least one sensor comprises an attitude angle, a range, or a rate of change in range of at least one object in a surrounding area of the motor vehicle.

4. A device for controlling at least one headlight in a motor vehicle, the device comprising:
a control apparatus;
at least one sensor configured to detect information about objects in an area surrounding the motor vehicle and to supply the information to the control apparatus,
wherein the control apparatus is configured to adjust the headlight depending on at least one detected object,
wherein a light source comprises a row or an array of light-emitting diodes or comprises an array of moveable micro-mirrors,
wherein the control apparatus is configured to adjust a range between the light source and at least one lens of the headlight so that a projection of the light source is focused on a certain range dependent on at least one detected object,
wherein the control apparatus is configured to control a servomotor, which is configured to adjust the range between the light source and the lens,
wherein the control apparatus is configured to compile an object list from the information about the objects, to select at least one of the objects from the object list as a relevant object, and to determine a range at which the projection of the light source is to be focused, corresponding to the selected object, and to correspondingly control the servomotor,
wherein a range change rate of at least one object in the surrounding area of the motor vehicle is determined using the at least one sensor such that the range between the at least one light source and the at least one lens is tracked by the control apparatus in order to keep the projection of the light source focused with respect to the selected object in event of a relative movement between the selected object and the motor vehicle.

5. The device of claim 1, wherein at least two headlights are provided with corresponding servomotors, wherein the control apparatus is configured to focus projections of the light sources of the at least two headlights differently with respect to different objects.

6. The device of claim 1, wherein the light source is tiltable relative to the lens.

7. A method for controlling at least one headlight in a motor vehicle, the method comprising:
detecting, by at least one sensor, information about objects in a surrounding area of the motor vehicle;
supplying, by the at least one sensor to a control apparatus, the information about the objects;
adjusting, by the control apparatus, the at least one headlight depending on at least one detected object;
adjusting, by the control apparatus, a range between at least one light source, which comprises a row or an array of light-emitting diodes or which comprises an array of micro-mirrors, and at least one lens of the headlight to focus a projection of the light source on the at least one detected object,
wherein the method further comprises
compiling, by the control apparatus, an object list from the information about the objects;
selecting, by the control apparatus, at least one of the objects from the object list as a relevant object; and
determining, by the control apparatus, a range at which the projection of the light source is to be focused, corresponding to the selected object, and to correspondingly control the servomotor.

8. The method of claim 7, wherein the control apparatus is configured to control a servomotor, which is configured to adjust the range between the light source and the lens.

9. The method of claim 7, wherein the at least one sensor is a radar sensor, a LiDar sensor, or a stereo camera.

10. The method of claim 7, wherein the information about objects detected by the at least one sensor comprises an attitude angle, a range, or a rate of change in range of at least one object in a surrounding area of the motor vehicle.

11. The method of claim 7, further comprising:
determining, using the at least one sensor, a range change rate of at least one object in the surrounding area of the motor vehicle;
tracking, by the control apparatus, the range between the at least one light source and the at least one lens; and
adjusting, based on the determined range change rate and the tracked range between the at least one light source and the at least one lens, the range between the at least one light source and the at least one lens to keep the projection of the light source focused with respect to the selected object in event of a relative movement between the selected object and the motor vehicle.

12. The device of claim 1, wherein the device is integrated in the headlight.

13. The device of claim 4, wherein the device is integrated in the headlight.

* * * * *